United States Patent
Laxhuber et al.

(10) Patent No.: US 9,479,759 B2
(45) Date of Patent: Oct. 25, 2016

(54) OPTICAL STEREO DEVICE AND AUTOFOCUS METHOD THEREFOR

(71) Applicant: Forstgarten International Holding GmbH, St. Gallen (CH)

(72) Inventors: Ludwig Laxhuber, Herrsching (DE); Joachim Luber, St. Margrethen (CH)

(73) Assignee: FORSTGARTEN INTERNATIONAL HOLDING GMBH, St. Gallen (CH)

( * ) Notice: Subject to any disclaimer, the term of this patent is extended or adjusted under 35 U.S.C. 154(b) by 560 days.

(21) Appl. No.: 13/797,453

(22) Filed: Mar. 12, 2013

(65) Prior Publication Data

US 2013/0250067 A1    Sep. 26, 2013

Related U.S. Application Data

(63) Continuation of application No. 13/637,421, filed as application No. PCT/EP2011/001388 on Mar. 21, 2011, now abandoned.

(30) Foreign Application Priority Data

Mar. 29, 2010    (EP) ..................................... 10003380

(51) Int. Cl.
    *H04N 13/02*    (2006.01)
(52) U.S. Cl.
    CPC ...... *H04N 13/0239* (2013.01); *H04N 13/0296* (2013.01)
(58) Field of Classification Search
    CPC ..................... H04N 13/0239; H04N 13/0296; H04N 13/0055; H04N 2013/0081; G06T 7/0022
    USPC ............................................................ 348/47
    See application file for complete search history.

(56) References Cited

U.S. PATENT DOCUMENTS

| | | | | |
|---|---|---|---|---|
| 3,626,828 A * | 12/1971 | Lindsey | ......................... | 396/324 |
| 4,601,053 A | 7/1986 | Grumet et al. | | |
| 6,002,426 A * | 12/1999 | Back et al. | ...................... | 348/87 |
| 7,571,856 B2 * | 8/2009 | Lo | ............................ | 235/462.01 |
| 8,170,717 B2 * | 5/2012 | Sutherland et al. | .......... | 700/245 |
| 8,780,081 B2 * | 7/2014 | Li et al. | ........................ | 345/174 |

(Continued)

FOREIGN PATENT DOCUMENTS

| | | | |
|---|---|---|---|
| JP | 2002-311331 A | 10/2002 | |
| JP | 2003-088495 A | 3/2003 | |

(Continued)

OTHER PUBLICATIONS

Written Opinion of ISA for PCT/EP2011/001388, mailed Oct. 11, 2012.

(Continued)

*Primary Examiner* — Shan Elahi
(74) *Attorney, Agent, or Firm* — McDonnell Boehnen Hulbert & Berghoff LLP (57) ABSTRACT

The present invention provides an optical stereo device with an autofocus feature as well as a corresponding autofocus method for optical stereo devices. The optical stereo device has imaging means configured to provide a stereo image of an object of interest by means of combining a right eye image and a left eye image and a control unit operatively connected to the imaging means and configured to receive the right eye image and the left eye image and to adjust the focus position of the imaging means.

15 Claims, 3 Drawing Sheets

(56) References Cited

U.S. PATENT DOCUMENTS

| | | |
|---|---|---|
| 9,188,791 B2 | 11/2015 | Ishii et al. |
| 2001/0014171 A1* | 8/2001 | Iijima et al. .................. 382/154 |
| 2001/0045979 A1* | 11/2001 | Matsumoto et al. ........... 348/43 |
| 2002/0085089 A1* | 7/2002 | McLaine et al. ............... 348/47 |
| 2003/0007680 A1* | 1/2003 | Iijima et al. .................. 382/154 |
| 2004/0263613 A1* | 12/2004 | Morita ............................ 348/51 |
| 2006/0023197 A1* | 2/2006 | Joel ................................ 355/77 |
| 2006/0028400 A1* | 2/2006 | Lapstun et al. .................... 345/8 |
| 2006/0061680 A1* | 3/2006 | Madhavan et al. ........... 348/370 |
| 2006/0204239 A1 | 9/2006 | Inaba |
| 2007/0126735 A1* | 6/2007 | Antonov et al. .............. 345/419 |
| 2007/0285554 A1* | 12/2007 | Givon ............................ 348/340 |
| 2008/0151097 A1* | 6/2008 | Chen et al. ................... 348/349 |
| 2008/0218612 A1* | 9/2008 | Border et al. ................ 348/262 |
| 2010/0194862 A1* | 8/2010 | Givon ............................ 348/49 |

FOREIGN PATENT DOCUMENTS

| | | |
|---|---|---|
| JP | 2003-296740 A | 10/2003 |
| WO | 96/38986 | 12/1996 |
| WO | 9638986 A1 | 12/1996 |
| WO | 2008112054 A1 | 9/2008 |

OTHER PUBLICATIONS

ISR for PCT/EP2011/001388, mailed Aug. 19, 2011.
Machine translation of Russian Patent No. RU 2160463.
Machine translation of Japanese patent application No. 2009-163220.
Machine translation of Japanese patent application No. 2010-155104.
Krotkov et al., "Stereo Ranging with Verging Cameras", IEEE Transactions on Pattern Analysis and Machine Intelligence, 12(12):1200-1205 (1990).

\* cited by examiner

OPTICAL STEREO DEVICE AND AUTOFOCUS METHOD THEREFOR

This application is a continuation of U.S. patent application Ser. No. 13/637,421 filed on Sep. 26, 2012, which is a U.S. national phase of International Application No. PCT/EP2011/001388 filed on Mar. 21, 2011, which claims priority to European Patent Application No. 10003380.2 filed on Mar. 29, 2010, the disclosures of which are incorporated herein by reference in their entirety.

TECHNICAL FIELD OF THE INVENTION

The invention relates to an optical stereo device and an autofocus method therefor. In particular, the invention relates to a stereo camera or stereo microscope as well as a method of automatically focussing such optical stereo devices.

BACKGROUND OF THE INVENTION

It is becoming more and more common that optical stereo devices, such as stereo cameras, are being used in a number of different fields. For instance, in the medical field stereo cameras and/or stereo microscopes are increasingly employed for assisting medical professionals in performing such tasks as medical surgeries, examinations and the like. This is because stereo cameras or microscopes can provide a three dimensional view of and, thus, further information about an object of interest. Typically, optical stereo devices provide for the possibility of zooming into a picture by means of a special lens system, such as a pancratic lens system. Some sophisticated stereo microscopes or stereo cameras include an autofocus mechanism, i.e. the ability to automatically bring the object of interest into focus. Such an autofocus mechanism can be provided, for instance, by means of a control device and operatively connected driving means that focus the lens system of the stereo microscope or stereo camera by moving the lens system to the best or optimal focus position, i.e. the position where the sharpest possible image of the object of interest is obtained.

Conventionally, the best focus position of a stereo microscope or stereo camera can be obtained automatically by several known methods. For instance, a first known autofocus method not restricted to stereo microscopes or stereo cameras is based on the fact that the contrast or sharpness of the object of interest generally is at maximum at the best focus position of the camera or microscope. The contrast of the image of the object of interest is generally determined by means of an image processing software running on a control unit and the focal length and/or distance between the camera or microscope and the object of interest is changed iteratively in the direction of higher contrast until no further improvement of the image quality is discernible. However, this known autofocus method, i.e. determining the best focus position by means of a contrast optimization, has the disadvantage that in most cases initially one has no information about (i) how far the current focus position is off the best or optimal focus position and (ii) in which direction the best focus position is with respect to the current focus position. Moreover, the relationship between the image quality and the distance of the actual focus position to the optimal focus position is actually not linear, but rather exponential. In other words, close to the optimal focus position the image quality changes much more rapidly than further away from the optimal focus position. As a consequence thereof, it is generally very difficult to find a range of acceptable focus positions around the optimal focus position as a first "guess", because outside of such a range of acceptable focus positions the image quality changes only gradually. Thus, autofocus methods based on contrast maximization are computationally quite challenging and because of the iterative approach generally not very fast.

Other known autofocus methods for optical stereo devices measure the reflection of a laser beam within the focus plane or use a specific spatial arrangement of two laser beams that coincide in the focus plane.

The object of the present invention is to provide an optical stereo device, such as a stereo camera or stereo microscope, that is configured to automatically focus its imaging unit in a new and improved way as well as a corresponding new and improved autofocus method.

SUMMARY OF THE INVENTION

The above object is achieved according to a first aspect of the present invention by an optical stereo device according to claim 1. The optical stereo device comprises imaging means configured to provide a stereo image of an object of interest by means of combining a right eye image and a left eye image and a control unit operatively connected to the imaging means and configured to receive the right eye image and the left eye image and adjust the focus position of the imaging means. The control unit is further configured to: (i) identify a feature in the right eye image and identify the same feature in the left eye image; (ii) determine the direction and/or the magnitude of a displacement vector defined by the displacement of the feature identified in the right eye image relative to the same feature identified in the left eye image; and (iii) adjust the focus position relative to the identified feature on the basis of the direction and/or the magnitude of the displacement vector.

Preferably, the imaging means comprise a first and a second imaging unit, wherein the right eye image is provided by the first imaging unit and the left eye image is provided by the second imaging unit.

According to a preferred embodiment, the control unit is configured to adjust the focus position by increasing the focus position in case the displacement of the identified feature is a shift to the right or decreasing the focus position in case the displacement of the identified feature is a shift to the left. Preferably, the control unit is configured to use an analytical representation of the relationship between the direction and/or magnitude of the displacement vector and the difference between a current focus position and the best focus position to bring the optical stereo device into focus. Alternatively or additionally, the control unit is configured to use a look-up table describing the relationship between the direction and/or magnitude of the displacement vector and the difference between a current focus position and the best focus position to bring the optical stereo device into focus.

Preferably, the optical stereo device is a stereo camera or a stereo microscope.

According to a second aspect the present invention provides for a method of automatically focusing an optical stereo device having imaging means operatively connected to a control unit and configured to provide a stereo image of an object of interest by combining a right eye image and a left eye image. The method comprises the steps of: (a) imaging the object of interest at a first focus position with the imaging means providing for the right eye image and the left eye image; (b) identifying a feature in the right eye image and identifying the same feature in the left eye image; (c) determining the direction and/or the magnitude of a displacement vector defined by the displacement of the feature identified in the right eye image relative to the same feature identified in the left eye image; and (d) adjusting the focus position relative to the identified feature on the basis of the direction and/or the magnitude of the displacement vector. Optionally, steps (a) to (d) can be repeated iteratively.

Preferably, the step of adjusting the focus position comprises changing the physical distance between the imaging means and the identified feature of the object of interest and/or changing the focal length of the imaging means.

According to a third aspect of the invention a computer-readable medium is provided containing instructions for performing the above described methods according to the second aspect of the invention.

Additional preferred embodiments, advantages and features of the present invention are defined in the dependent claims and/or will become apparent by reference to the following detailed description and accompanying drawings.

DETAILED DESCRIPTION OF PREFERRED EMBODIMENTS

The present invention will now be further described by defining different aspects of the invention generally outlined above in more detail. Each aspect so defined may be combined with any other aspect or aspects unless clearly indicated to the contrary. In particular, any feature indicated as being preferred or advantageous may be combined with any ocher feature or features indicated as being preferred or advantageous.

Figure 1:
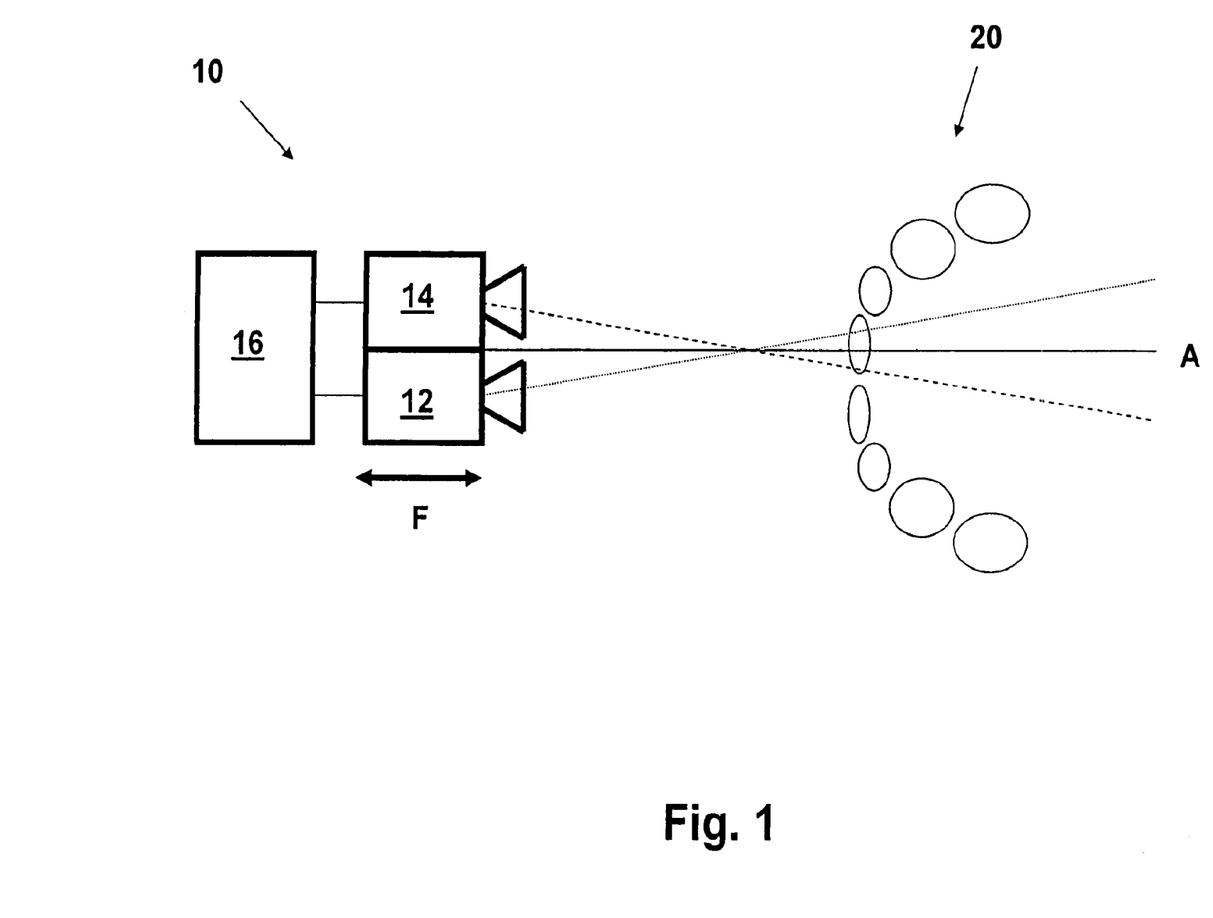
FIG. 1 shows schematically a preferred embodiment of an optical stereo device according to the present invention comprising imaging means in form of a first imaging unit and a second imaging unit.

A preferred embodiment of the present invention is shown in FIG. 1. An optical stereo device 10, e.g. a stereo camera or a stereo microscope, comprises a first imaging unit 12 and a second imaging unit 14. The first imaging unit 12 and the second imaging unit 14 are arranged relative to each other to define two optical paths or axes crossing each other at the focal plane. Because of their slightly different optical paths the first imaging unit 12 and the second imaging unit 14 provide two different images of the object of interest 20, such as a patient's dental region, that can be combined to create a stereo image thereof. The person skilled in the art is well aware of possible internal configurations of the first and second imaging units 12, 14 as well as the necessary components therefor so that these will not be described in greater detail. It is just briefly mentioned that the first and second imaging units 12, 14 could each comprise various optical lenses for appropriately guiding and/or magnifying the light within the imaging units as well as a detector, such as a CCD detector, for receiving the light from the object of interest 20. The various optical lenses are used to adjust a focus as well as a zoom factor of the optical stereo device 10. For this purpose, the lenses can be displaced individually or in groups along the respective optical axis of the first imaging unit 12 and the second imaging unit 14.

Moreover, the optical stereo device 10 according to the present invention comprises a control unit 16 operatively connected to the first and second imaging units 12, 14. The control unit 16 is configured to receive data provided by the first and second imaging units 12, 14, i.e. images of the object of interest 20, and to combine these images into a stereo image thereof. Furthermore, the control unit 16 is configured to move the first and second imaging units 12, 14 and/or certain optical lenses thereof in the direction of the arrow F along the optical axis A of the optical stereo device 10 in order to adjust the current focus position relative to the object of interest 20 and/or change the zoom factor.

The person skilled in the art will appreciate that a physical movement of the complete imaging units 12 and 14 resulting in a change of the distance between the imaging units 12 and 14 and the object of interest 20 in the context of the present invention is equivalent to a positional adjustment of the internal optical elements of the imaging units 12 and 14 resulting in a change of the focal length of the imaging units 12 and 14 so that both options are covered by the present invention. The control unit 16 can be connected with an input device (not shown in FIG. 1) by means of which a user can input data, commands and the like to operate the optical stereo device 10 according to the present invention, such as, manually changing the focus position and/or the zoom factor. The input device can be implemented as a touch pad, a keyboard, a plurality of switches and/or knobs or the like, as is well-known in the context of control mechanisms. Moreover, the control unit 16 can be connected with an output device, such as a display unit or stereo monitor (not shown in FIG. 1), for displaying the stereo image of the object of interest 20 created by the control unit 16 on the basis of the respective images provided by the first imaging unit 12 and the second imaging unit 14.

The first imaging unit 12 provides a first image of the object of interest 20 that will be referred to herein as the "right eye image". Likewise, the second imaging unit 14 provides a second image of the object of interest 20 that will be referred to herein as the "left eye image". As the person skilled in the art is well aware and as already described above, because of a slight spatial separation between the first imaging unit 12 and the second imaging unit 14 and, thus, slightly different viewing angles the control unit 16 can compose on the basis of the right eye image provided by the first imaging unit 12 and the left eye image provided by the second imaging unit 14 a three dimensional image or stereo image of the object of interest 20. However, in the context of the present invention a right eye image and a left eye image can also be provided by a single imaging unit that is moved between a first position and a slightly offset second position providing for two slightly different viewing angles with respect to the object of interest 20.

The person skilled in the art will appreciate that in the top plan view of FIG. 1 an observer standing behind the optical device 10 and looking along the optical axis A thereof towards the object of interest 20 defines a unique reference frame. Relative to this reference frame the first imaging unit 12 is located on the right and provides a right eye image and the second imaging unit 14 is located on the left and provides a left eye image of the object of interest 20. Further below the autofocus mechanism according to the present invention will be described in the context of this reference frame.

Moreover, reference will be made herein to the "best focus position", "bringing into focus" or "being in focus".

The person skilled in the art will appreciate that these expressions define a state or position corresponding to that relative position between the first and second imaging units 12, 14 and an identified feature of the object of interest 20 where the distance between the first and second imaging units 12, 14 and the identified feature of the object of interest 20 is substantially equal to the focal length of the first and second imaging units 12, 14.

According to the present invention the control unit 16 is configured to implement an autofocus mechanism, the specifics of which will now be described in more detail. This autofocus mechanism according to the present invention is based on the general idea that in images, provided by the imaging means of optical stereo devices, objects located outside of (i.e. in front of or behind) the focal plane are shifted or displaced relative to the position they would have when being in focus, i.e. in the focal plane. According to the present invention it is possible from the direction of the displacement vector, i.e. either to the left or to the right, to determine the direction in which the current focus position has to be adjusted to bring the object of interest 20 or an identified feature thereof into focus. Moreover, the magnitude of this displacement vector allows determining the necessary change of focus position (i.e. the difference between the current focus position and the best focus position) for bringing the object of interest 20 or an identified feature thereof into focus.

Figure 2:
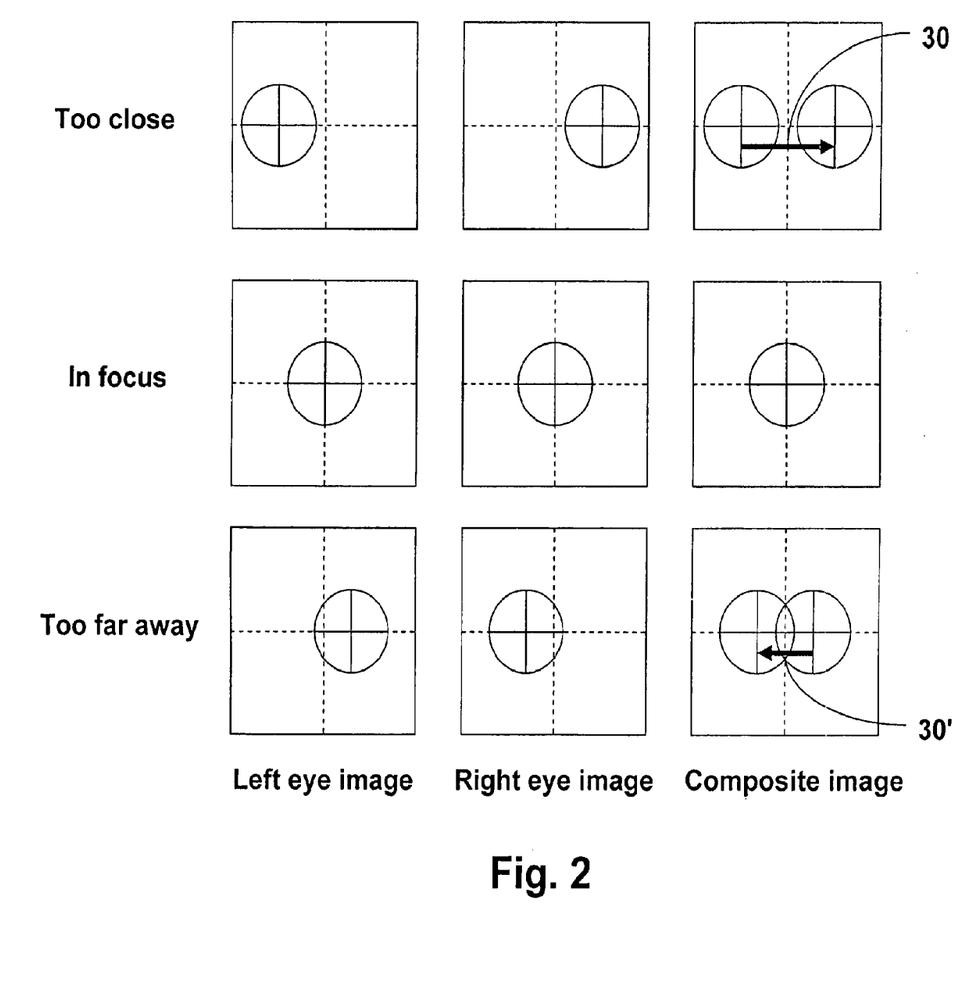
FIG. 2 shows schematically a right eye image provided by a first imaging unit, a left eye image provided by a second imaging unit as well as a composite image for three different cases, when the optical stereo device according to the present invention is in and out of focus, respectively.

FIG. 2 shows schematically various exemplary images provided by the first and second imaging units 12, 14 of the optical stereo device 10 as well as corresponding composite stereo images created by the control unit 16 on the basis thereof in order to explain the main idea of the present invention.

The middle row of FIG. 2 (named "In focus") shows schematically the left eye image provided by the second imaging unit 14 (left hand column of FIG. 2), the right eye image provided by the first imaging unit 12 (middle column of FIG. 2) and a composite image (right hand column of FIG. 2) of an identified, preferably unique feature of the object of interest 20 for the case when the identified feature of the object of interest 20 is in focus, i.e. the distance between the first and second imaging units 12, 14 and the identified feature of the object of interest 20 is substantially equal to the focal lengths of the first and second imaging units 12, 14. In this case the right eye image and the left eye image of the identified feature of the object of interest 20 are substantially identical (except any possible minor variations because of the slightly different viewing angles of the first and the second imaging units 12, 14 with respect to the object of interest 20 providing for the stereo effect). In other words, in this case the composite image of the identified feature of the object of interest 20 (shown in the right hand column of FIG. 2) created by means of the control unit 16 simply by overlapping the right eye image and the left eye image is substantially identical to the right eye image and the left eye image, respectively.

The upper row of FIG. 2 (named "Too close") shows schematically the left eye image, the right eye image and the composite image of an identified, preferably unique feature of the object of interest 20 for the case when the distance between the first and second imaging units 12, 14 and the identified feature of the object of interest 20 is less than the focal length of the first and second imaging units 12, 14. For this case the identified feature of the object of interest 20 will be located at different positions in the right eye image and the left eye image, as can be taken more clearly from the composite image for this case shown in the right hand column of FIG. 2. More specifically, for this case, i.e. when the distance between the first and second imaging units 12, 14 and the identified feature of the object of interest 20 is less than the focal length of the first and second imaging units 12, 14, the identified feature of the object of interest 20 is shifted or displaced to the right in the right eye image relative to the same identified feature of the object of interest 20 in the left eye image, as indicated by the displacement vector 30 shown in the composite image for this case.

The lower row of FIG. 2 (named "Too far away") shows schematically the left eye image, the right eye image and the composite image of an identified, preferably unique feature of the object of interest 20 for the opposite case, i.e. when the distance between the first end second imaging units 12, 14 and an identified feature of the object of interest 20 is greater than the focal lengths of the first and second imaging units 12, 14. Also for this case the identified feature of the object of interest 20 will be located at different positions in the right eye image and the left eye image, as can be taken more clearly from the composite image for this case shown in the right hand column of FIG. 2. More specifically, for this case, i.e. when the distance between the first and second imaging units 12, 14 and the identified feature of the object of interest 20 is greater than the focal length of the first and second imaging units 12, 14, the identified feature of the object of interest 20 in the right eye image is shifted or displaced to the left relative to the identified feature of the object of interest 20 in the left eye image, as indicated by the displacement vector 30' shown in the composite image for this case.

In order to be able to advantageously implement the above findings the control unit 16 of the optical stereo device 10 according to the present invention is configured: (i) to identify a preferably unique feature of the object of interest 20 in the right eye image provided by the first imaging unit 12 and identify the same feature of the object of interest 20 in the left eye image provided by the second imaging unit 14; (ii) to determine the direction and the magnitude of a displacement vector 30, 30' defined by the displacement of the feature of the object of interest 20 identified in the right eye image relative to the same feature identified in the left eye image; and (iii) to adjust the current focus position relative to the identified feature of the object of interest 20 on the basis of the direction and the magnitude of the displacement vector 30, 30' by increasing the focus position in case the displacement is a shift to the right or decreasing the focus position in case the displacement is a shift to the left.

As the person skilled in the art will appreciate and as already mentioned above, an increase of the focus position relative to the identified feature of the object of interest 20 can be attained by increasing the distance between the first and second imaging units 12, 14 and the identified feature of the object of interest 20 and/or by decreasing the focal length of the first and second imaging units 12, 14. Likewise, a decrease of the focus position can be attained by decreasing the distance between the first and second imaging units 12, 14 and the identified feature of the object of interest 20 and/or by increasing the focal length of the first and second imaging units 12, 14, for instance, by means of an appropriate positional adjustment of the optical lenses and elements of the first and second imaging units 12, 14.

For identifying a preferably unique feature of the object on interest 20 in the right eye image provided by the first imaging unit 12 and for identifying the same feature of the object of interest 20 in the left eye image provided by the second imaging unit 14 appropriate image processing algorithms can be implemented in the control unit 16. For instance, differential algorithms based on derivative expressions and/or algorithms based on local extrema of the intensity values can be used for feature identification, as is well known to the person skilled in the art. Similar image processing algorithms can be implemented in the control unit 16 to determine the direction and the magnitude of a displacement of the identified feature of the object of interest 20 in the right eye image relative to the same feature in the left eye image.

Preferably, the control unit 16 of the optical stereo device 10 according to the present invention is, moreover, configured to determine the best focus position on the basis of the direction and the magnitude of the displacement vector 30, 30' defined by the displacement of the identified feature of the object of interest 20 in the right eye image relative to the same feature in the left eye image. In other words, the control unit 16 of the optical stereo device 10 according to the present invention is, moreover, configured to determine on the basis of the direction and the magnitude of the displacement vector 30, 30' the change of focus position that is necessary to bring the identified feature of the object of interest 20 into focus. For simple optical stereo devices and/or within certain focus position ranges it might be the case that the relationship between the magnitude of the displacement vector 30, 30' and the necessary change of focus position to bring the optical stereo device 10 into focus, i.e. the difference between the current focus position and the best focus position, can be described by a linear or possibly a slightly more complex analytical equation. In such a case this analytical equation would be implemented in the control unit 16 allowing the control unit 16 to determine the required change of focus position on the basis of the magnitude of the displacement vector 30, 30'.

However, for more complicated optical stereo devices it generally might not be possible to express the relationship between the magnitude of the displacement vector 30, 30' and the necessary change of focus position to bring the optical stereo device 10 into focus, i.e. the difference between the current focus position and the best focus position, as an analytical equation (at most approximations, for instance, in the vicinity of the best focus position can be implemented as analytical equations in the control unit 16). Preferably, in such a case the control unit 16 is configured to have access to an appropriate look-up table stored on the control unit 16 itself or a memory unit (not shown) connected thereto. The person skilled in the art will appreciate that such a look-up table can be produced by performing a sort of calibration of the optical stereo device 10 prior to operation. For instance, a look-up table can be produced by determining the magnitudes of the displacement vectors for a simple object of interest 20 located at the following exemplary positions relative to the best focus position: −10 cm, −5 cm, −2.5 cm, −1 cm, −0.5 cm, 0 cm, 0.5 cm, 1 cm, 2.5 cm, 5 cm and 10 cm. By doing so it is possible to assign to the determined magnitudes of the displacement vectors the corresponding respective distances of the calibration focus position from the best focus position. As the person skilled in the art will appreciate, in operation the control unit 16 can use an interpolation mechanism for determining the necessary change of focus position for magnitudes of the displacement vector falling between two successive values listed in the look-up table. Different look-up tables can be used for different zoom factors.

Figure 3:
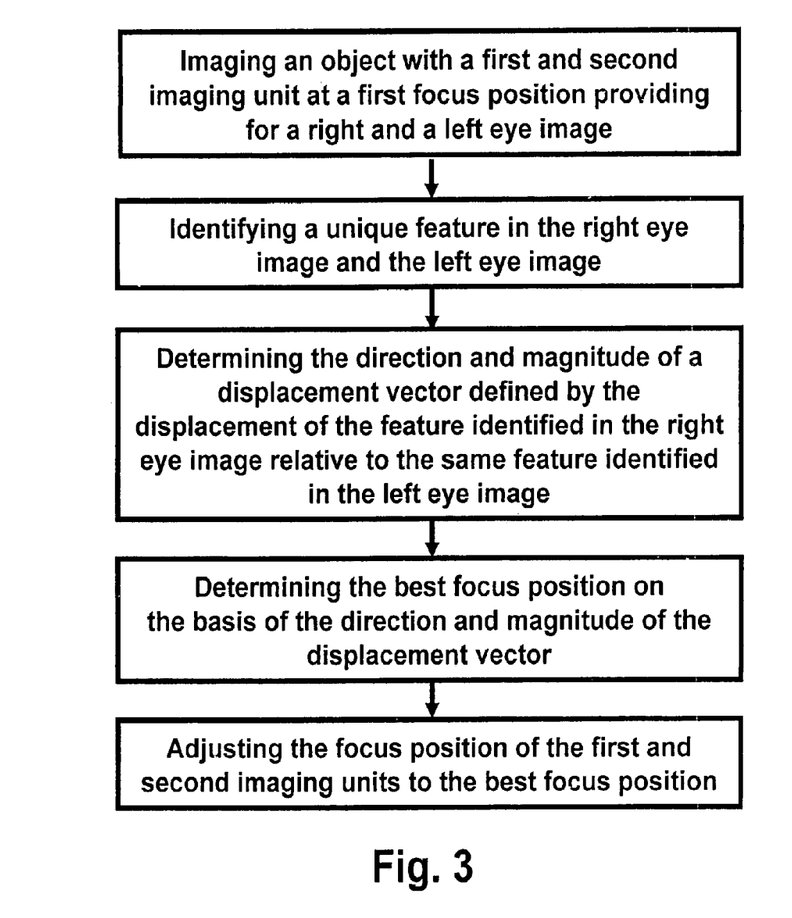
FIG. 3 shows a flow diagram describing different steps of a preferred embodiment of an autofocus method according to the present invention.

FIG. 3 shows a flow diagram highlighting exemplary steps of a method of automatically focusing the optical stereo device 10 according to the present invention. The method preferably comprises the steps of: (a) imaging the object of interest 20 at a first focus position with the first imaging unit 12 providing for a right eye image and the second imaging unit 14 providing for a left eye image; (b) identifying a preferably unique feature of the object of interest 20 in the right eye image and identifying the same feature in the left eye image; (c) determining the direction and magnitude of a displacement vector 30, 30' defined by the displacement of the feature identified in the right eye image relative to the same feature identified in the left eye image; and (d) adjusting the focus position of the first imaging unit 12 and the second imaging unit 14 relative to the identified feature of the object of interest 20 on the basis of the direction and the magnitude of the displacement vector 30, 30', preferably by increasing the focus position in case the displacement is a shift to the right or decreasing the focus position in case the displacement is a shift to the left.

The present invention inter alia provides for the following advantages. In case a focus position has been determined by means of the devices and/or methods according to the present invention at a small zoom factor with a relatively large depth of field providing for an acceptable sharpness, this focus position will be identical or very close to the best focus position. This ensures that, when the user changes to a larger zoom factor resulting in a smaller depth of field, the image will still be in focus. Moreover, according to the present invention it is straightforward to determine on the basis of the direction (i.e. left or right) or equivalently the sign (i.e. plus or minus) of the displacement vector whether the identified feature of the object of interest lies in front of or behind the focal plane defined by the given settings of the optical stereo device (e.g. zoom factor). By means of this information it is readily possible to adjust the focus position in the right direction. This is advantageous in comparison to prior art autofocus methods based on contrast techniques, because these prior art methods require an image or images taken at at least two focus positions to determine the direction in which the focus position has to be adjusted in order to improve the focus/sharpness.

The present invention as described in detail above is not limited to the particular devices, uses and methodology described as these may vary. For instance, although the present invention has been described above in the context of stereo cameras or microscopes, it can also be applied advantageously to other optical stereo devices including an autofocus feature, such as binoculars. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The invention claimed is:

1. An optical stereo device, comprising:
   an imaging device configured to provide a stereo image of an object of interest by combining a right eye image and a left eye image; and
   a control device operatively connected to the imaging device and configured to:
   (a) receive the right eye image and the left eye image from the imaging device;
   (b) identify a feature of the object in the right eye image and identify the same feature of the object in the left eye image;
   (c) determine the direction and/or the magnitude of a displacement vector defined by a displacement of the feature of the object identified in the right eye image relative to the same feature of the object identified in the left eye image; and
   (d) adjust a focus position of the imaging device relative to the identified feature of the object on the basis of the direction and/or the magnitude of the displacement vector.

2. The optical stereo device of claim 1, wherein the imaging device comprises a first and a second imaging device and wherein the right eye image is provided by the first imaging device and the left eye image is provided by the second imaging device.

3. The optical stereo device of claim 1, wherein the control device is configured to adjust the focus position by increasing the focus position in a case where the displacement of the feature of the object identified in the right eye image relative to the same feature of the object identified in the left eye image is a shift to the right or decreasing the focus position in a case where the displacement of the feature of the object identified in the right eye image relative to the same feature of the object identified in the left eye image is a shift to the left.

4. The optical stereo device of claim 3, wherein the control device is configured to use an analytical representation of the relationship between direction and/or magnitude of the displacement vector and a difference between a current focus position and a best focus position to bring the optical stereo device into focus.

5. The optical stereo device of claim 3, wherein the control device is configured to use a look-up table describing the relationship between the direction and/or magnitude of the displacement vector and a difference between a current focus position and a best focus position to bring the optical stereo device into focus.

6. The optical stereo device of claim 1, wherein the optical stereo device is a stereo camera.

7. The optical stereo device of claim 6, wherein the optical stereo device is a stereo microscope.

8. A method of automatically focusing an optical stereo device having an imaging device operatively connected to a control device and configured to provide a stereo image of an object of interest by combining a right eye image and a left eye image, wherein the method comprises the steps of:
   (a) imaging, by the imaging device, the object of interest at a focus position with the imaging device providing for the right eye image and the left eye image;
   (b) identifying, by the control device, a feature of the object in the right eye image and identifying the same feature of the object in the left eye image;
   (c) determining, by the control device, the direction and/or the magnitude of a displacement vector defined by a displacement of the feature of the object identified in the right eye image relative to the same feature of the object identified in the left eye image; and
   (d) adjusting, by the control device, the focus position relative to the identified feature of the object on the basis of the direction and/or the magnitude of the displacement vector.

9. The method of claim 8, wherein in step (a) the right eye image is provided by a first imaging device and the left eye image is provided by a second imaging device.

10. The method of claim 8, wherein in step (d) the focus position is adjusted by increasing the focus position in a case where the displacement of the feature of the object identified in the right eye image relative to the same feature of the object identified in the left eye image is a shift to the right or decreasing the focus position in a case where the displacement of the feature of the object identified in the right eye image relative to the same feature of the object identified in the left eye image is a shift to the left.

11. The method of claim 10, wherein an analytical representation of the relationship between direction and/or magnitude of the displacement vector and a difference between a current focus position and a best focus position is used to bring the optical stereo device into focus.

12. The method of claim 10, wherein a look-up table describing the relationship between the direction and/or magnitude of the displacement vector and a difference between a current focus position and a best focus position is used to bring the optical stereo device into focus.

13. The method of claim 8, wherein step (d) of adjusting the focus position comprises changing a physical distance between the imaging device and the identified feature of the object of interest and/or changing the focal length of the imaging device.

14. The method of claim 8, wherein the steps of (a) imaging, by the imaging device, the object of interest at a focus position with the imaging device providing for the right eye image and the left eye image, (b) identifying, by the control device, a feature of the object in the right eye image and identifying the same feature of the object in the left eye image, (c) determining, by the control device, the direction and/or the magnitude of a displacement vector defined by a displacement of the feature of the object identified in the right eye image relative to the same feature of the object identified in the left eye image, and (d) adjusting, by the control device, the focus position relative to the identified feature of the object on the basis of the direction and/or the magnitude of the displacement vector are repeated iteratively.

15. A non-transitory computer-readable medium containing instructions that, when executed by one or more processors of a control device, cause the control device to perform functions comprising:
   (a) receiving, from an imaging device, a right eye image and a left eye image of an object of interest;
   (b) identifying a feature of the object in the right eye image and identifying the same feature of the object in the left eye image;
   (c) determining the direction and/or the magnitude of a displacement vector defined by a displacement of the feature of the object identified in the right eye image relative to the same feature of the object identified in the left eye image; and (d) adjusting a focus position of the imaging device relative to the identified feature of the object on the basis of the direction and/or the magnitude of the displacement vector.

\* \* \* \* \*